Patented Feb. 7, 1950

2,496,387

UNITED STATES PATENT OFFICE 2,496,387

COMPOSITION OF MATTER SUITABLE FOR DENTAL LINERS

Arthur Fink, New York, N. Y.

No Drawing. Application February 6, 1946, Serial No. 645,959

10 Claims. (Cl. 32—2)

This invention relates to compositions of matter and is herein illustrated as embodied in a composition especially adapted for forming a lining for dental plates to make them fit more accurately, but which is also useful in other ways. For example, the composition may be used for making impressions which will retain the impress of the harder part of the mouth tissues and thus obtain a better fit for the working of the muscles.

One serious problem that faces dentists is the problem of fitting dentures that are worn or re-fitting them to allow for shrinkage of the mouth tissues, and powdered or granular materials have been devised to be distributed on the ill-fitting dentures so that they may be pressed into shape by the tissues of the mouth. Some of these powders are relatively insoluble adhesives which last for a few days only and become contaminated. Others have been made from natural resins, and still others have been made from insoluble synthetic resins combined with a solvent which gradually is extracted in the mouth leaving the liner as solidified resin, shaped by the pressure of the mouth tissues where it was spread out in the denture.

The liners based on synthetic resins sometimes included a relatively insoluble plasticizer which theoretically should be satisfactory but which was found to wash out so slowly in the mouth that many difficulties arose in use. The material hardened slowly, sometimes requiring a week or ten days or even a month. Thus the liner remained soft too long and became misshapen, and sometimes particles of food became embedded in the liner.

According to the present invention, resin, such as ethyl or methylmethacrylate resin or cellulose plastic such as the acetate or polyvinyl resin, may be admixed with the plasticizer which is highly soluble in water. When a plasticizer and resin are mixed in suitable proportions under proper conditions, a jelly-like material is obtained which may, if desired, be provided to dentists in the form of a thin sheet adapted to be laid in the denture and then may be shaped by pressure of the tissues of the mouth. Such a material is readily hardened by placing the formed material in water or even by remaining in the mouth.

One object of the invention is to provide a composition which is plastic in nature and which may be used either as a liner for dentures or as an impression material.

Another object of the invention is to produce a composition which is permanent when stored under proper conditions, is non-toxic and substantially odorless and tasteless, and has no adverse effect on the membranes of the mouth.

Another object of the invention is to provide dentists with a moldable denture lining in the form of a sheet readily cut to be spread in a denture, and then adapted to be readily hardened.

Another object of the invention is to provide a composition which may eventually become of the same composition as the denture to which it is applied and with which it unites completely.

To obtain these and other ends, the invention is disclosed as embodying a plasticizer which consists largely of mono-acetate or di-acetate of ether-bearing glycols such as the polyethylene glycols. It is found that a wide variety of polyethylene glycol acetates is satisfactory. Triethylene glycol di-acetate may be used but is of such a nature that it gives a burning taste. Diethylene glycols have been reported as poisonous, but the tetra-ethylene glycol and the higher ethylene glycols are practically tasteless and non-toxic, and their acetates are very satisfactory plasticizers, so that the lining in the denture carrying the polyethylene glycol di-acetate lining is readily hardened either by leaving in the mouth in the course of a few hours or by immersing in running water for say an hour or more.

It is found that the higher the polyethylene glycol acetate used, the faster the plasticizing compound washes out. The acetates of several polyethylene glycols commercially known as having average molecular weights of 200 or 300 or 400 or 600 are all commercially useful both as monoacetates and as di-acetates. All these have the advantage of being completely and easily soluble in water so that a denture lining hardens in several hours.

It is possible to vary the properties of the composition in the present invention by including a non-fugitive plasticizer equal to say 1% to 10% of the polyethylene glycol compound. Suitable ones are dibutyl phthalate, butyl stearate, and butyl-phthalyl butyl glycolate, and castor oil. Thus it is possible to prepare either liners or impression compounds of varied properties to suit special conditions or purposes.

When the polyethylene glycol di-acetate or other acetate plasticizer is washed out and the liner has hardened on the denture, it can be finished very satisfactorily by grinding, as by sand papering and polishing.

The material is made in bulk and when pressed can be readily flattened out to a suitable thickness for lining uses or impression uses between steel plates, preferably with a stop around the margin to control the thickness of the sheet. Where used as a liner, a thickness of one millimeter has been found very satisfactory. Other features and advantages will hereinafter appear.

Two hundred parts by weight of polyethylene glycol di-acetate of apparent molecular weight of 200 were heated to between 75° C. and 120° C. and one hundred parts of finely divided methyl methacrylate polymer were stirred in and stirring continued for several minutes until the material became uniform and of a jelly-like consistency. Nothing more was required. It was pressed out into sheets either warm or cold.

It was found possible to substitute a previously plasticized methyl methacrylate polymer.

When cooled, the composition was pressed between the plates and yielded jelly-like but highly elastic material and made an excellent liner and an excellent impression material, being in each case well-adapted to be hardened by mere soaking in water, or by wearing in the mouth as in a denture.

One advantage of the product is its jelly-like elastic consistency, which enables "undercut" surfaces to be accurately molded, so that, when the molding material is withdrawn, it springs out to clear the undercut slope and then springs back into place. It adheres to ordinary acrylic denture plates.

Where used as a liner, it is often desirable to add a pigment or a dye to simulate the color of the denture.

One very satisfactory form in which to provide the composition for use as a lining by dentists is to press it into a sheet about a millimeter or more thick. An ordinary hand operated letter press, such as is used for copying letters, is satisfactory. It may be allowed to stand for half an hour before opening the press, thus avoiding a tendency to curl.

To enable the material to be handled easily and sanitarily, it is often best to cover the top and bottom plates of the mold with waxed paper, preferably that known as a wet waxed paper, before putting the composition between the plates.

This waxed paper can be easily stripped from the material, but enables it to be handled with ease and kept sterile.

The dentist usually cuts the material to proper size before stripping off the paper, thus enabling him to do most of the handling of the material while it is still protected by the paper and thus kept sterile. It strips clean and easily from the paper and also from glass.

Having thus described my invention, I claim:

1. A flexible, jelly-like composition of matter comprising a material selected from the group consisting of the synthetic resin ethyl and methyl methacrylate resin and polyvinyl resin and the plastic cellulose acetate, and twice as much by weight of a polyethylene glycol acetate plasticizer having a molecular weight not less than 200.

2. A flexible, jelly-like composition of matter consisting principally of methyl methacrylate resin and about twice as much by weight of polyethylene glycol acetate plasticizer having a molecular weight not less than 200.

3. A flexible, jelly-like composition of matter comprising a material selected from the group consisting of the synthetic resin ethyl and methyl methacrylate resin and polyvinyl resin and the plastic cellulose acetate, a plasticizer in about twice the amount by weight of the resin and including a polyethylene glycol acetate having a molecular weight not less than 200, and an insoluble plasticizer in less quantity of between 1% and 10%.

4. A composition of matter comprising methyl methacrylate resin, a plasticizer in about twice the amount by weight of the resin and including polyethylene glycol acetate having a molecular weight of about 200, and an insoluble plasticizer in less quantity of between 1% and 10%.

5. The process of making a composition suitable as a denture liner or as an impression material which comprises heating together for several minutes at about 100° C. a material selected from the group consisting of ethyl and methyl methacrylate and polyvinyl resin and the plastic cellulose acetate, and polyethylene glycol acetate having a molecular weight not less than 200 to cause them to commingle.

6. The process of making a composition suitable as a denture liner or as an impression material which comprises heating together for several minutes at about 100° C. methyl methacrylate polymer and about twice as much by weight of polyethylene glycol acetate having a molecular weight of 200.

7. The process of making a composition suitable as a denture liner or as an impression material which comprises heating together for several minutes at about 100° C. methyl methacrylate polymer, about twice as much by weight of polyethylene glycol acetate having a molecular weight not less than 200, and a lesser amount of an insoluble plasticizer amounting to 1% to 10%.

8. An article of manufacture in the form of a thin sheet of methyl methacrylate polymer carrying about twice as much polyethylene glycol acetate having a molecular weight of not less than 200, and adapted to serve as a denture liner.

9. An article of manufacture in the form of a thin sheet of methyl methacrylate polymer carrying about twice as much polyethylene glycol acetate having a molecular weight of 200 and carried between sheets of waxed paper and adapted to serve as a denture liner.

10. An article of manufacture in the form of a thin sheet of methyl methacrylate polymer carrying about double its weight of polyethylene glycol di-acetate having a molecular weight not less than 200 and carried between sheets of non-adherent cellulose material, and adapted to serve as a denture liner.

ARTHUR FINK.

REFERENCES CITED

The following references are of record in the file of this patent:

UNITED STATES PATENTS

| Number | Name | Date |
| --- | --- | --- |
| 2,031,036 | Dreymann | Feb. 18, 1936 |
| 2,377,041 | Rogover | May 29, 1945 |
| 2,392,135 | Farr | Jan. 1, 1946 |